Dec. 14, 1943.  S. W. McCHESNEY, JR  2,336,559

WALL BOX

Filed Dec. 31, 1940

INVENTOR
SAMUEL W. MC CHESNEY JR.
BY
Hyde and Meyer
ATTORNEYS

Patented Dec. 14, 1943

2,336,559

UNITED STATES PATENT OFFICE 2,336,559

WALL BOX

Samuel W. McChesney, Jr., Carey, Ohio, assignor to Porcelain Products, Inc., Findlay, Ohio, a corporation of Delaware Application December 31, 1940, Serial No. 372,601

11 Claims. (Cl. 229—3.3)

This invention relates to improvements in wall boxes, and more particularly to improved means for supporting a wall box of insulating material in various adjusted positions relative to the finished face of a wall.

One of the objects of the present invention is to provide adjustable support means for a wall box of insulating material wherein the support does not require any openings passing through the walls of the box and, where the support means or bracket itself is of metal, none of the metal is exposed on the inner walls of the box.

Other objects and advantages of the invention include novel means for combining the support with the box itself, means for attaching the box to either of two surfaces at right angles to each other, and other details of design and construction as will more fully appear from the accompanying drawing and description.

Figure 1:
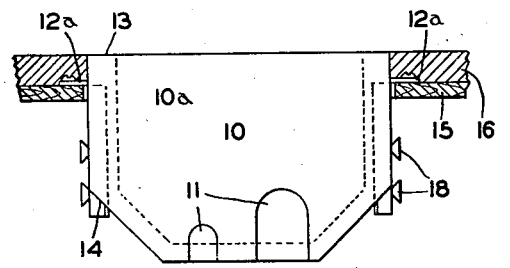
Figure 2:
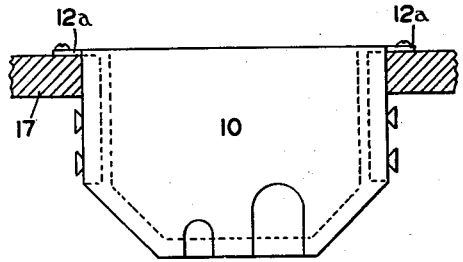
Figure 3:
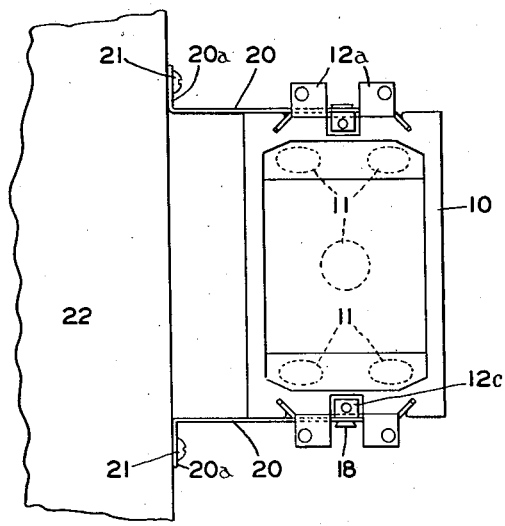
Figure 4:
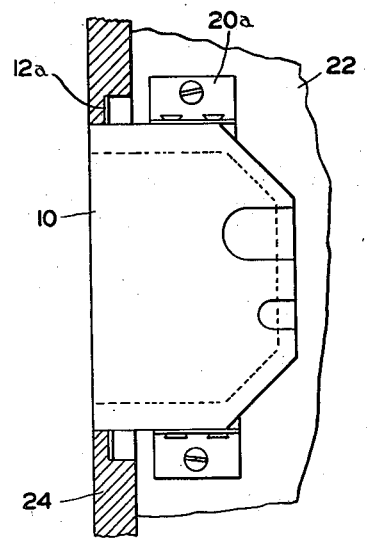
Figure 5:
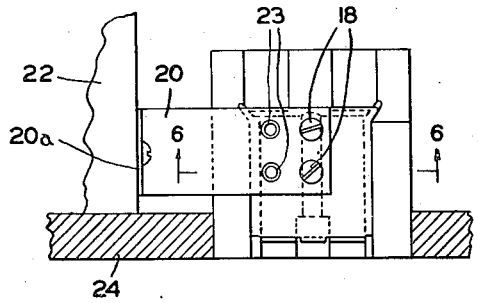
Figure 6:
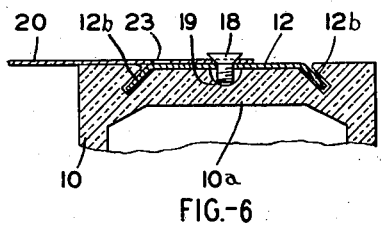

In the drawing, Figs. 1 and 2 are side elevational views showing my improved wall box attached by novel supporting means to different types of finished walls, making use of the adjustability of the supports; Fig. 3 is a front elevational view of the wall box supported on a stud or other surface to one side of the box; Figs. 4 and 5 are a side elevational view and a top plan view respectively of the device shown in Fig. 3; while Fig. 6 is an enlarged fragmental sectional view taken along the line 6—6 of Fig. 5.

The wall box which forms the subject matter of this invention is of the usual type for housing an electrical device in a fireproof manner with concealed wiring. The present invention concerns itself with a box composed entirely of insulating material and provided with adjustable support means made of metal wherein none of the metal extends to the inner walls of the box. In the form here shown the box 10 is of some insulating material such as porcelain or Bakelite, and is composed entirely of this insulating material except for the support means which is located entirely on the outer face of the box. Incidental features of the box having nothing to do with the present invention comprise knock-out portions 11 located at various points as is customary in the trade.

In the embodiment of the invention disclosed herewith a metallic plate 12 provided with projecting ears or lugs 12a for attachment to lath, wall board or the like, is provided at each of the opposite ends of the wall box and mounted for slidable adjustment toward and away from the open front face of the box. The plate has a central portion parallel to the wall 10a of the box and edge flanges 12b extending at an angle to the central portion of the plate and in the form here shown diverging outwardly from the central portion of the plate and extending into the material of the porcelain wall 10a. The wall is provided with suitable slots for slidingly receiving the flanges 12b. These slots extend from the point 13, Fig. 1, to the point 14 so that the plate 12 may extend out either the top or bottom ends of these slots if necessary or desirable. The slots are open at the outer faces of the walls and terminate short of the inner faces of the walls.

Means is provided for holding the plate 12 in various adjusted positions so that the ears 12a may support the open front end of the box flush with the finished surface of different types of wall construction. For instance, in Fig. 1 the ears 12a are set back from the face of the wall box for securement to the lath 15 of the wall construction which has a finished plaster surface 16. Obviously the lath 15 may be wood or metal or any other material. In Fig. 2 the ears 12a are in position to engage the exposed face (toward the room) of wall board 17. As will be well understood, an escutcheon plate will cover the ears 12a when the structure is complete. The means shown here for holding the plate 12 in various positions comprises one or more screws 18 which in the present instance have threaded engagement with the plate 12 and extend into a trough 19 extending along the outer face of each end wall of the wall box perpendicular to the open face thereof as best seen in Fig. 6. Obviously when the screw 18 is jammed against the bottom of the trough it holds the flanges 12b frictionally against the sides of the slots in the wall so as to hold the plate firmly in position.

An ear 12c on each plate 12 is turned inwardly and threaded to receive a screw for attachment of the device housed in the wall box as is customary in fixtures of this sort. The threaded opening in the ear 12c is directly opposite the end of trough 19 so that any extra screw length is accommodated in the trough.

It is obvious from an inspection of the various views and especially Fig. 6, that none of the metal of the supporting plates or brackets extends to the inner face of the box 10 and therefore the insulating character of the box is not destroyed to the slightest degree. Also it will be noted that the diverging edge flanges 12b extend into the thickened corners of the box 10 leaving sufficient porcelain material in the walls of the box so as to provide a very strong construction.

It will be noted in the form of the device so far described that the ears 12a are fastened, by screws extending through openings in the ears, to the lath or wall board of a wall which is substantially parallel to the open front face of the box. However, in many installations it is desirable to support the box from a surface extending at right angles to the plane of the open front face of the box and to one side thereof. This construction is seen in Figs. 3 to 5. For this purpose I may added other plates or laterally extending members 20 extending substantially parallel to the front face of the box and provided with ears 20a for attachment by screws 21 to a stud or other surface 22. One novel way of providing these members 20 without interfering with the usefulness of the first described form of my device is to provide these members 20 in the form of additional plates secured to the plates 12. A very cheap construction as shown in the present drawing is to provide openings in the members 20 for receiving the screws 18 as best seen in Figs. 5 and 6 so that the screws 18 serve the double purpose of attaching the members 20 to the plate 12 while at the same time securing the supporting means in adjustable position on the box 10. An additional set of holes is shown at 23, Figs. 5 and 6, so that the member 20 may be moved to another position for supporting the wall box closer to the stud 22 if desired.

With this last described modification the wall box is supported on the stud 22 or upon any other vertical surface with the same provision for adjustment as before. In other words as shown in Figs. 4 and 5, a wall board 24 may be secured to the stud 22 to provide the finished surface of the wall. The front face of the box 10 may be supported flush to the finished surface of this wall regardless of the thickness of the wall board by simply setting the adjusting screws 18 so as to hold the plates 12 and 20 in the desired position for attachment to the stud 22 so as to give the desired result.

What I claim is:

1. In combination, a wall box having an open front face where the side walls of said box terminate in a plane, said box walls being of insulating material and having slot means extending at right angles to said face, means for securing said box to a support parallel to said face, said last named means being movable to various adjusted positions along said slot means, and other means movable with said last named means for securing said box to a support at right angles to said face.

2. The combination of claim 1 including common means for securing said two last named means together and for holding them in adjusted position along said slot means.

3. In combination, a wall box having an open front face where the side walls of said box terminate in a plane, said box walls being of insulating material, a plate movable along and substantially parallel to a wall of said box toward and from said open face, said plate having flanges extending angularly relative to each other and into the walls of said box, there being slots in said walls to receive said flanges, said slots being open at the outer faces of said walls and terminating short of the inner faces thereof, and means connected with said plate for attachment to a support.

4. In combination, a wall box having an open front face where the side walls of said box terminate in a plane, said box walls being of insulating material, said box having two opposed walls, plates movable one along and outside of and substantially parallel to each of said opposed walls of said box toward and from said open face, edge flanges on each of said plates extending angularly from the central portion of said plate into the walls of said box and at right angles to said face, there being slots in said opposed walls to slidingly receive said flanges, said slots being open at the outer faces of said walls and terminating short of the inner faces thereof, a screw threaded in each plate and adapted to engage the adjacent wall of said box for holding said plate in adjusted positions, and means on said plate for attachment to a supporting surface.

5. The combination of claim 4 including a second plate secured to each of said first named plates and extending substantially parallel to said open face for securement to a support at one side of said box.

6. The combination of claim 4 including a second plate secured to each of said first named plates by said screw and extending substantially parallel to said open face for securement to a support at one side of said box.

7. In combination, a wall box having an open front face where the side walls of said box terminate, said side walls being located angularly to each other forming a polygon in section, said box walls being of insulating material, a plate movable along the outer face of a wall of said box toward and from said open face, said plate having flanges extending substantially parallel to the associated wall, said flanges diverging outwardly, there being slots in said wall to receive said flanges, said slots being open at the outer face of said wall and terminating short of the inner face of said wall, and said slots extending into the corners where said side walls are joined, whereby impairment of the strength of said side walls is minimized.

8. In combination, a wall box having an open front face where the side walls of said box terminate in a plane, said box walls being of insulating material, a plate movable along and substantially parallel to a wall of said box toward and from said open face, said plate having flanges extending angularly relative to each other and into the walls of said box, there being slots in said walls to receive said flanges, said slots being open at the outer faces of said walls and terminating short of the inner faces thereof, and means carried by said plate for the attachment of an electrical device housed in said box.

9. In combination, a wall box having side walls and an open front face where the walls of the box terminate in a plane, the box walls being made of insulating material, a plate mounted upon the external surface of one of the box walls with its general plane parallel to said surface, interconnecting guiding means comprising part of the plate and part of the external surface of the box walls formed to permit sliding adjustment of the plate toward and from the front face of the box, and means on the plate abutting an external surface of a box wall for securing the plate in any position of adjustment.

10. In combination, a wall box having a bottom and four side walls formed from one piece of insulating material, the end edge portions of the side walls terminating in a common plane, a metal supporting plate adjustably mounted flatwise upon the outer surface of the box walls and having its outer surface exposed and also having two opposite parallel edge portions extending normal to said plane, the outer surface of the box being formed to provide means interlocked with the plate edge portions and serving to guide said plate as it is adjusted along a wall toward and from said plane and also to prevent escape of the plate from the wall by motion outwardly from the surface of the wall, and means for securing the plate to the box in any position to which it is adjusted.

11. In combination, a wall box having a bottom and four side walls formed from one piece of insulating material, the end edge portions of the side walls terminating in a common plane, a metal supporting plate adjustably mounted flatwise upon the outer surface of the box walls and having its outer surface exposed and also having two opposite parallel edge portions extending normal to said plane, the outer surface of the box being formed to provide means interlocked with the plate edge portions and serving to guide said plate as it is adjusted along a wall toward and from said plane and also to prevent escape of the plate from the wall by motion outwardly from the surface of the wall, and adjustable means mounted upon an exposed portion of the plate and engaging an imperforate portion of the box covered thereby for securing the plate to the box in any position to which it is adjusted.

SAMUEL W. McCHESNEY, Jr.